Patented Oct. 18, 1949

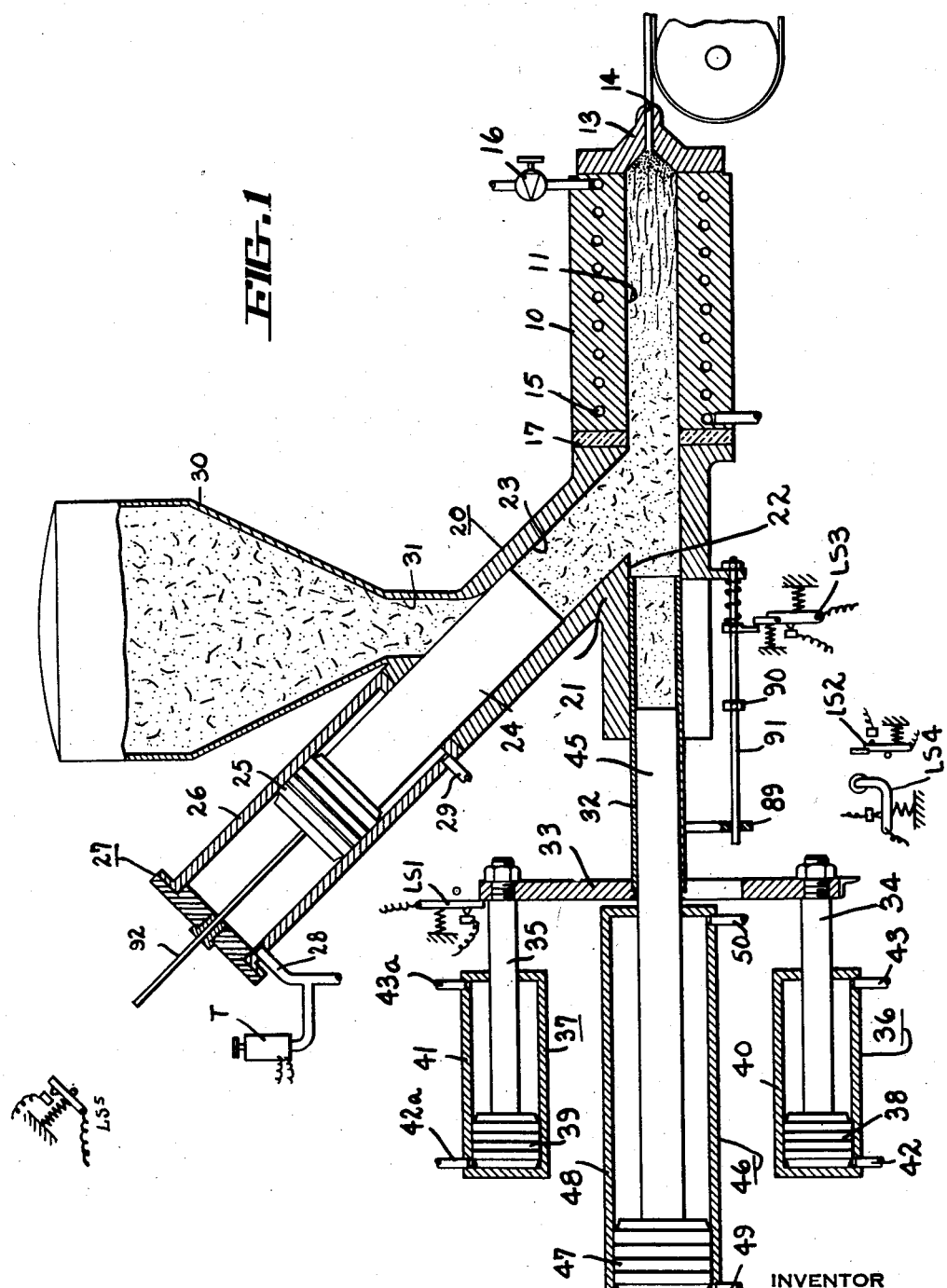

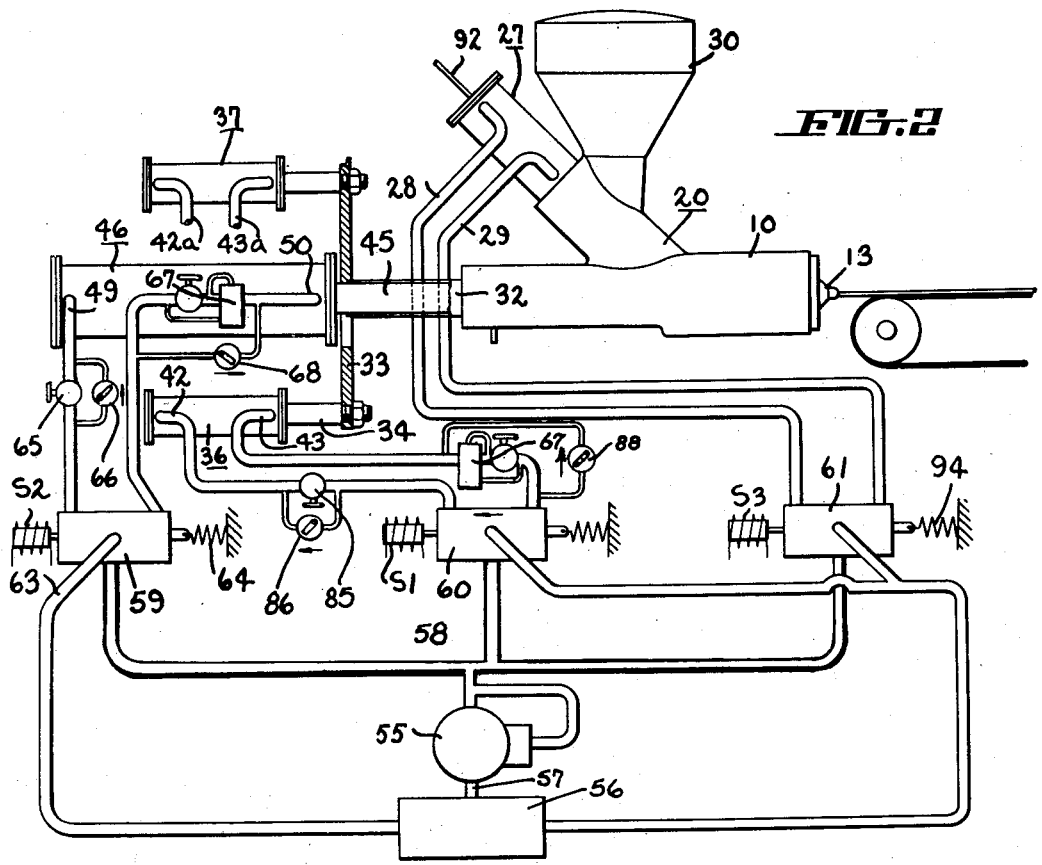

2,485,523

UNITED STATES PATENT OFFICE 2,485,523

HYDRAULIC INJECTION OF PLASTICS AS A CONTINUOUS STRIP

Bernard D. Ashbaugh, Mount Gilead, Ohio, assignor to H-P-M Development Corporation, a corporation of Delaware Application July 21, 1943, Serial No. 495,553

8 Claims. (Cl. 18—12)

This invention relates to injection apparatus, and particularly to apparatus for continuously ejecting plastic material from an injection cylinder whereby continuous length strips can be produced.

An object of the invention is to provide an apparatus for injection moulding wherein there is provided a plurality of injection plungers that are operated in such a manner that plastic material may be continuously ejected from an injection cylinder in substantially constant volume whereby to produce a plastic strip of a substantially continuous length.

Another object of the invention is to provide an injection apparatus that is constructed and arranged in a manner that an injection plunger ejects plastic material from an injection cylinder while another injection plunger is operated to pick up a fresh charge of plastic material and compact the same in readiness for movement into the injection cylinder as soon as the first plunger completes its injection stroke so that the second plunger may continue the ejection of plastic material from the injection cylinder while the first plunger is returned and charged with plastic material.

A still further object of the invention is to provide an apparatus for extruding continuous length plastic articles, or strips, wherein granular plastic material is intermittently fed into the injection chamber, but wherein a plurality of injection plungers operate upon the plastic material as fed into the injection cylinder so as to produce a substantially continuous and constant flow of plasticized plastic material from the injection cylinder.

A still further object of the invention is to provide an apparatus in accordance with the foregoing object wherein there is provided a sleeve valve for intermittently closing off one of the injection plungers whereby it may reciprocate to pick up a fresh charge of granular plastic material for feeding into the injection cylinder when the sleeve valve is operated to open the feed opening into the injection cylinder toward the end of the injection stroke of another injection plunger.

Another object of the invention is to provide an apparatus for injection moulding wherein there is provided a hydraulic control system for operating a plurality of plungers that force plastic material from the injection cylinder wherein the hydraulic system is arranged to operate the plungers for obtaining a substantially constant discharge of plastic material from the injection, or extrusion chamber.

Another object of the invention is to provide a hydraulic system for an injection or extrusion apparatus in accordance with the foregoing object wherein the injection plunger is operated by a constant volume flow of hydraulic fluid thereto for operating the same at a relatively constant speed while the feed plunger of the injection or extrusion machine is operated by a relatively constant hydraulic pressure.

It is another object of the invention to provide a hydraulic control system, and an associated electrical control system, for obtaining a substantially constant volume flow of plasticized plastic material from an injection or extrusion machine.

Further objects and advantages will become apparent from the drawings and the following description.

Figure 1 is a cross-sectional view of an injection apparatus constructed and arranged for performing a substantially continuous operation and flow of plastic material;

Figure 2 is a schematic hydraulic control system for operating the apparatus illustrated in Figure 1;

Figure 3 is a schematic electrical control system adapted to function concurrently with operation of the hydraulic control system, and to control the same;

Figure 4 is a cross-sectional view of a control arrangement for obtaining a constant volume delivery of hydraulic fluid.

In this invention the injection or extrusion apparatus consists of an injection cylinder 10 that has a cylinder bore 11 in which plastic material is heated for ejection or extrusion through an extrusion nozzle 13, having a nozzle orifice, or die, of suitable contour for forming the desired shape of strip that is being extruded or ejected thru the nozzle 13. The injection cylinder 10 is provided with heating passages 15 through which a suitable heating fluid is transmitted, a control valve 16 being provided for regulating the flow of heating fluid through the heating passage 15. It is to be understood of course that while a heating fluid may be used for heating the plastic material and plasticizing the same within the injection cylinder 10, that other forms of heating apparatus may be used for producing the required heating effect upon the plastic material within the injection cylinder 10.

The injection cylinder 10 is connected to a feeding unit 20, a wall of heat insulating material 17 being provided between the injection cylinder 10 and the feeding unit 20 to prevent heat conduction from the injection unit to the feeding unit.

The feeding unit 20 consists of a Y-shaped body 21 that has a cylinder bore 22 provided in axial alignment with the cylinder bore 11 of the injection cylinder 10. A second cylinder bore 23 is disposed angularly with respect to the cylinder bore 22 and provides the feeding chamber for feeding granular, or powdered, plastic material into the cylinder bore 11.

The feeding cylinder bore 23 has a plunger 24 therein and adapted to reciprocate within the cylinder bore 23. This plunger 24 has a piston on one end thereof that reciprocates within a cylinder 26 whereby to form a hydraulic motor 27. The hydraulic motor 27 is provided with fluid inlet conduits 28 and 29 at opposite ends thereof whereby to cause reciprocation of the piston 25 in the cylinder 26 in the usual and conventional manner for operating a double acting hydraulic motor.

The feed cylinder bore 23 is connected to a feed hopper 30 through means of a feed passage 31 that is opened and closed by reciprocation of the plunger 24 across the end of the feed passage 31. The hopper 30 receives the plastic material that is to be fed into the injection cylinder 10.

The cylinder bore 22 receives a sleeve valve member 32 that is slidably disposed in the cylinder bore 22 for reciprocation therein whereby to close the feed opening 23 under certain conditions of operation of the machine to be hereinafter described.

The sleeve valve member 32 is connected to a cross member 33 that is connected to the ends of a pair of plunger members 34 and 35 that extend from the hydraulic motors 36 and 37 respectively. The plunger members 34 and 35 have pistons 38 and 39 on the end thereof for reciprocation within the cylinders 40 and 41 respectively. The hydraulic motor 36 is provided with fluid conducting passages 42 and 43 that are connected to opposite ends of the hydraulic motor 36 for operating the same in conventional manner as a double acting hydraulic motor. The fluid motor 37 is connected in parallel with the fluid motor 36 whereby they are operated concurrently, the fluid motor 37 having the fluid conducting passages 42a and 43a for this purpose.

An injection plunger 45 reciprocates within the sleeve valve member 32, and is operated by means of the hydraulic motor 46. The injection plunger 45 is provided with a piston 47 on the end thereof that reciprocates within the cylinder 48, fluid conducting passages 49 and 50 are provided for the hydraulic motor 46 whereby to deliver fluid to opposite ends thereof and reciprocate piston 47 in conventional manner for operating the motor 46 as a double acting fluid motor.

The hydraulic control system for operating the machine hereinbefore described consists of a hydraulic pump 55. This pump 55 may preferably be of the constant pressure variable delivery type of pump of any conventional and well known variety, but it is understood that any suitable hydraulic pump for supplying fluid under pressure may be used in producing the fluid pressure required to operate the apparatus hereinbefore described. The pump 55 receives fluid from a reservoir 56 by means of a conduit 57 and discharges the same under pressure into a supply conduit 58 that is connected to the four-way valves 59, 60, and 61 for supplying fluid under pressure thereto. The four-way valves 59, 60, and 61 are all of conventional construction wherein they are provided with a pair of supply conduits that connect to the hydraulic motors to be operated thereby, and a return conduit for returning fluid from the hydraulic motors to the reservoir.

The four-way valve 59 controls the flow of hydraulic fluid to the hydraulic motor 46, the conduits 49 and 50 connecting to the four-way valve 59 to receive fluid under pressure therefrom and return fluid to the four-way valve according to the direction of the movement of piston 47 therein, in conventional manner. A return conduit 63 connects the four-way valve 59 with the supply reservoir 56 for returning fluid thereto from the hydraulic motor 46. The controlling valve member of the four-way valve 59 is normally held in a position by means of the tension spring 64 whereby to interconnect the pressure supply conduit 58 from the pump 55 and the conduit 50 of the hydraulic motor 46. The valve member 59 is operated by means of the solenoid $S_2$ when energized to shift the flow of fluid under pressure from the conduit 58 to the conduit 49.

A choke valve 65 is in the conduit 49 to resist the discharge of fluid from the left-hand end of the hydraulic motor 46, and a check valve 66 is provided to by-pass the choke valve 65 and permit a free flow of hydraulic fluid to the left-hand end of the hydraulic motor 46, all of which will be hereinafter described.

A constant volume flow control valve 67 is provided in the conduit 50 of the hydraulic motor 46 to resist the flow of fluid from the right-hand end of the motor 46 at a constant rate when the injection plunger moves on a forward or injection stroke, this valve 67 being by-passed by the check valve 68 to provide a free flow of hydraulic fluid to the right-hand end of the motor upon delivery of pressure fluid thereto.

The constant volume flow control member is more particularly disclosed and described in the patent to T. L. Farnham, #2,146,537, dated February 7, 1939, but in general the control valve consists of a body member 70 that has a piston or plunger 71 reciprocable therein. An annular groove or recess 72 is connected to the fluid pressure inlet conduit 73 while an annular groove 74 is connected to the discharge conduit 75. The annular grooves are prevented from intercommunication except by means of the recess 76 provided in the surface of the plunger 71.

The plunger 71 is spring pressed upward, as viewed in Figure 4, by means of the spring 77. The top face 78 of the plunger 71 extends into a chamber 79 that is connected by means of a conduit 80 with the discharge conduit 75 and ahead of the choke valve 81. A conduit 82 connects the discharge side of the choke valve with the chamber 83 in which the spring 77 is mounted.

The operation of the constant volume flow control valve 67 is such as to maintain a constant pressure drop across the choke valve 81 and thereby maintain constant volume flow therethrough. As pressure tends to increase in the conduit 75, the pressure will be transmitted to the upper face 78 and the plunger 71 and thereby urge the same downwardly to restrict the flow of fluid to the choke valve 81, whereas any increase in pressure in the discharge conduit 84 from the choke valve 81 tends to move the plunger 71 upwardly and thereby increase the flow to the valve 81. The balance maintained between the conduits 80 and 82 produces a constant volume flow through the choke valve 81.

The four-way valve 60 is maintained in a normal position with the supply conduit 58 from the pump 55 being inter-connected with the conduit 43 of the hydraulic motor 36, and thus connected to the conduit 43a of the hydraulic motor 37. The valve 60 is operated to shift the flow of pressure fluid to the conduits 42 and 42a of the hydraulic motors 36 and 37 when the solenoid $S_1$ is energized in a manner to be hereinafter described. A choke valve 85 is provided in the conduit 42, and thus conduit 42a, to resist the flow of fluid from the left-hand end of the hydraulic motors 36 and 37, a check valve 86 by-passing the choke valve 85 to provide a free flow of pressure fluid to the left-hand end of the motors 36 and 37. A constant volume flow control valve 87 is provided in the conduit 43 of the motor 36, and thus in the conduit 33a of the motor 37, whereby to resist the flow of fluid from the right-hand end of the hydraulic motors 36 and 37 when they move to advance the sleeve valve member 32, and thereby control the rate of said advancement of the sleeve valve member at a constant rate. A check valve member 88 by-passes the constant volume flow control valve 87 to provide a free flow of hydraulic fluid into the conduits 43.

The hydraulic motor 27 is connected to the four-way valve 61 by means of the service lines 28 and 29, the valve 61 being maintained in a normal position with the pressure supply line 58 being connected to the service line 29. When the solenoid $S_3$ is energized the flow of hydraulic fluid is changed from the service line 29 to the service line 28.

The electrical control circuit associated with the hydraulic circuit just previously described consists of a limit switch $LS_1$ that is engaged by the cross member 33 which carries the sleeve valve member 32 when the sleeve valve member 32 is fully retracted to thereby close the switch $LS_1$ to initiate reversal of the hydraulic motors 36 and 37 and again advance the sleeve valve member 32. A limit switch $LS_2$ is engaged by the cross member 33 when the sleeve valve member 32 approaches the position wherein it closes the feed opening 23, this closing of the switch $LS_2$ thereby causing the hydraulic motor 46 to be operated to place the plunger 45 on a forward or ejection stroke.

A limit switch $LS_3$ is opened when an arm 89 carried by the sleeve valve 32 engages a collar 90 carried on the rod 91. The limit switch $LS_3$ is opened concomitantly with closure of the feed opening 23 by the sleeve valve 32 whereby to operate the hydraulic motor 27 and reverse movement of the plunger 24.

A limit switch $LS_5$ is closed when engaged by a tail rod 92 carried by the piston 25 of the hydraulic motor 27 so as to cause operation of the hydraulic motor 27 to reverse the same and advance the hydraulic motor and thereby force a fresh charge of granular material downwardly into the feed opening 23. When the plunger 24 builds up resistance against the plastic material in the feed opening 23 to compress the same, a tonnage control T will be operated due to the increase of pressure built up in the hydraulic motor 27 to cause operation of the hydraulic motors 36 and 37 whereby to retract the sleeve valve 32 and open the feed opening 23.

When the said valve member approaches its full retracted position it engages limit switch $LS_4$ to open the same thereby causing operation of the hydraulic motor 46 to retract the injection plunger 45.

The operation of the machine heretofore described is a continuous operation so that a certain position of the apparatus must be assumed in order to begin the description of the cycle of operation of the machine. It will therefore be assumed that the injection plunger 45 is completely retracted, that the plunger 24 has picked up a fresh charge of plastic material and is now forcing the same through the injection cylinder 10 and that the sleeve valve member 32 has just completed its retraction movement and limit switch $LS_1$ has just been engaged. Under these conditions of operation solenoid $S_3$ has previously been energized whereby to shift the four-way valve 60 to supply fluid under pressure to the service line 28 of the hydraulic motor 27.

When limit switch $LS_1$ is closed contactor B will be energized whereby to close contacts $B_1$ and $B_2$ to provide a holding circuit for contactor B and energize solenoid $S_1$. With solenoid $S_1$ energized, the four-way valve 60 is shifted to inter-connect the conduit 58 with the service conduit 42 of the hydraulic motor 36 to thereby cause the motor to begin a forward stroke.

At this time hydraulic fluid is being delivered through the constant volume flow control valve 87 whereby the forward advancement of the sleeve valve 32 is controlled at a pre-determined rate of movement. This is essential at this time because it will be remembered that the plunger 24 is applying pressure upon the plastic material in the injection cylinder 10 and forcing plasticized material therefrom so that the sleeve valve 32 must overcome the pressure developed in the plastic material to permit its forward movement irrespective of the pressure that may tend to retard its forward movement. Any pressure developed by the advancement of the sleeve valve 32 by its forward advancement that is greater than the pressure required to eject plastic material will react upon the plunger 24 and tend to slow down the plunger so that the resultant pressure on the plastic material in the injection cylinder 10 will be constant and thereby maintain a constant flow of plasticized material through the injection or extrusion nozzle 13.

Just before the sleeve valve 32 closes the feed opening 23 to prevent any further movement of plastic material from chamber 23, the limit switch $LS_2$ will be engaged by the member 33 which carries the sleeve 32. When this limit switch $LS_2$ is closed a contactor C will be energized to close the contacts $C_1$ and $C_2$ whereby to provide a holding circuit for the contactor C and energize the solenoid $S_2$.

When the solenoid $S_2$ is energized the four-way valve 59 is shifted to inter-connect the pressure supply conduit 58 with the conduit 49 of the hydraulic motor 46 by way of the check valve 66 and thereby begin forward advancement of the injector plunger 45. At this time return of hydraulic fluid from the opposite end of the hydraulic motor 46 through the conduit 50 will be resisted by the constant volume flow control valve 67 and thereby permit the plunger 45 to move on a forward stroke at a constant rate of movement.

For a short interval there will be a simultaneous forward advancement of the injection plunger 45, the sleeve valve 32, and the plunger 24. However, since the plunger 24 is being moved by the application of a constant pressure applied thereon it will be seen that any excess pressure developed by forward advancement of the plunger 45 and the sleeve valve 32 will tend to resist movement of the plunger 24 and thereby slow down the plunger so that the net result will be the application of a constant pressure upon the plastic material within the injection cylinder 10 for producing a constant flow of the material through the nozzle or extrusion die 13.

The plunger 45 and the sleeve valve 32 will now move forward together until the sleeve valve closes the feed passage 23, at which time the limit switch LS₃ will be opened by engagement of the arm 89 with the collar 90 on the rod 91.

When the limit switch LS₃ is opened the contactor A is de-energized thereby opening contacts A₁ and A₂ to de-energize solenoid S₃. De-energization of solenoid S₃ shifts the four-way valve 61, now under control of the spring 94, to interconnect the pressure supply conduit 58 with the service line 29 and thus retract the plunger 24. Retraction of the plunger 24 permits a fresh charge of granular plastic material to pass from the hopper 30 through the feed opening 31 into the feed chamber 23. The plunger 24 will retract until the tail rod 92 engages the limit switch LS₅ to close the same whereby to re-energize contactor A and close contacts A₁ and A₂ and thus re-energize solenoid S₃ to shift the four-way valve 61 and again reconnect the supply conduit 58 with the service line 28 to cause advancement of the plunger 24 into the feed chamber 23.

The plunger 24 will advance to compact the charge of plastic material in the chamber 23 until it is finally stopped, it being remembered that the sleeve valve 32 now closes the feed opening 23. When pressure builds up in hydraulic motor 27 the tonnage control T will be operated to open circuit through the contactor B and thereby open contacts B₁ and B₂ to de-energize the solenoid S₁ and shift the four-way valve 60 to cause retraction of the sleeve valve member 32.

As soon as the sleeve valve 32 begins to open the feed chamber 23 the pressure in the hydraulic motor 27 will fall to that pressure required for ejecting plastic material through the nozzle 13, or extrusion die, that will be substantially less than the maximum pressure at which the tonnage control T was set, so that the tonnage control will now close circuit and recondition the circuit for the contactor B for a subsequent operation.

At this time the plunger 24 is moving forward for extrusion of plastic material together with the plunger 45 and the sleeve valve 32 is retracting. Therefore the plastic material being moved by the plunger 24 will fill in the space left by the sleeve valve 32 caused by its retraction and pressure will be maintained upon the plastic material in the injection cylinder 10 for forcing the same thru the extrusion die 13.

When the sleeve member 32 approaches its fully retracted position the limit switch LS₄ will be engaged and opened by means of the cross-member 33 whereby the contactor C is de-energized to open contacts C₁ and C₂ and thus de-energize solenoid S₂, this shifting the four-way valve 59 so that the pressure supply conduit 58 is connected with the supply conduit 50 for delivering fluid to the hydraulic motor 46 to cause retraction of the injection plunger 45.

The continued advancement of the plunger 24 will fill in the space between injection plunger 45 during its retraction movement and also maintain pressure upon the plastic material in the injection cylinder 10 so as to continue extrusion of plastic material through the extrusion nozzle 13.

When the sleeve valve 32 reaches its fully retracted position the limit switch LS₁ will again be engaged to close the same and initiate the cycle of operation that has just been described.

While the apparatus heretofore disclosed and described constitutes a preferred form of the invention, yet it will be understood that the apparatus is capable of alteration without departing from the spirit of the invention, and that all such modifications as follow within the scope of the appended claims are intended to be included herein.

Having thus fully described my invention, what I claim as new and desire to secure by Letters Patent is:

1. An extrusion apparatus that includes an extrusion cylinder, power-actuated feeding means for feeding plastic material into said extrusion cylinder for filling the same and simultaneously ejecting material from the cylinder, power-actuated means for ejecting plastic material from said extrusion cylinder, means operable concomitantly with said feeding means for cutting off the flow of plastic material from said feeding means to said extrusion cylinder to stop ejection of plastic material by said feeding means, and means actuated by said last mentioned means upon approaching the position to cut off the flow of plastic material from the feeding apparatus to place said power-operated ejecting means in operation to eject plastic material from said extrusion chamber.

2. An extrusion apparatus that includes, an extrusion cylinder, a source of material, a feeding chamber connected with said extrusion cylinder and connected to said source of material, feeding means for forcefully feeding plastic material from said feeding chamber into said extrusion cylinder and concomitantly ejecting plastic material from the extrusion cylinder, valve means for closing off said feeding chamber from the extrusion cylinder, injection plunger means for ejecting plastic material from said extrusion chamber, means causing said feeding means to apply a substantially constant pressure upon the plastic material fed thereby and upon the body of plastic material in the injection cylinder associated therewith to fill said injection cylinder with plastic material and simultaneously eject plastic material from said cylinder, and means causing said injection plunger to operate at a pre-determined rate of forward advancement to eject plastic material from said injection cylinder and oppose the pressure applied on the plastic material by said feeding means to render the same less effective in proportion to the pressure applied upon the plastic material by the injection plunger to retain relatively constant pressure upon the plastic material for continuously extruding the same.

3. An extrusion apparatus including, an injection cylinder, a feeding chamber associated therewith, a feeding plunger reciprocable therein for feeding plastic material from said feeding chamber into said cylinder and for concomitantly ejecting plastic material therefrom, a fluid motor for operating said feed plunger, valve means for closing off said feed chamber from said injection cylinder, fluid motor means for operating said valve means, an injection plunger, fluid motor means for operating said injection plunger, means for applying pressure of a relatively constant value on said feed motor means to advance the same for feeding plastic material into said cylinder and ejecting plastic material therefrom, means controlling operation of said feed motor means and said injection plunger motor means to cause simultaneous operation thereof just before said valve means closes off said feed chamber and means for controlling the stroke of said injection plunger at a relatively constant rate of advancement when ejecting plastic material from said cylinder whereby the overlapping injection stroke of said feed plunger with said injection plunger will be resisted by said injection plunger to reduce the effect of said feed plunger upon the plastic material within said cylinder and thereby maintain the pressure upon the plastic material relatively constant to obtain a constant discharge of plastic material from said cylinder.

4. An extrusion apparatus including, an injection cylinder, a feeding chamber associated therewith, a feeding plunger reciprocable therein for feeding plastic material from said feeding chamber into said cylinder and for ejecting plastic material therefrom, a fluid motor for operating said feed plunger, valve means for closing off said feed chamber from said injection cylinder, fluid motor means for operating said valve means, an injection plunger, fluid motor means for operating said injection plunger, means for applying pressure of a relatively constant value on said feed motor means to advance the same for feeding plastic material into said cylinder and ejecting plastic material therefrom, means controlling operation of said feed motor means and said injection plunger motor means to cause simultaneous operation thereof just before said valve means closes off said feed chamber, means for controlling the stroke of said injection plunger at a relatively constant rate of advancement when ejecting plastic material from said cylinder whereby the overlapping injection stroke of said feed plunger with said injection plunger will be resisted by said injection plunger to reduce the effect of said feed plunger upon the plastic material within said cylinder and thereby maintain the pressure upon the plastic material relatively constant to obtain a constant discharge of plastic material from said cylinder, said controlling means including means responsive to the closed position of said valve means for retracting said feed plunger, means responsive to retraction movement of said plunger to advance the same with a fresh charge of material, means responsive to a predetermined pressure in the feed chamber to open said valve means and means responsive to the open position of said valve for reversing said injection plunger and permit advancement of said feed plunger for ejecting plastic material from said cylinder and simultaneously filling the space left by said injection plunger by the retraction of the same in preparation of a new stroke of said injection plunger.

5. An apparatus for continuous extrusion that includes, an extrusion cylinder, feeding means for feeding material into said extrusion cylinder, pressure means for actuating said feeding means with a predetermined pressure for filling said extrusion cylinder and simultaneously eject material from the extrusion cylinder, plastic material flow controlling means operable during operation of said feeding means for cutting off the feeding of material into said extrusion cylinder and thereby stop ejection of plastic material by said feeding means, an ejection means for ejecting material from said extrusion cylinder, means for operating said ejection means at a relatively constant rate of movement irrespective of resistance met by said ejection means, and means operated by said flow controlling means just before the said means stops flow of material to said extrusion cylinder for initiating actuation of said ejection means to place same in operation before said pressure operated feeding means stops ejecting material from said extrusion cylinder to thereby maintain continuous extrusion from the extrusion cylinder at relatively constant pressure upon the material in the extrusion cylinder.

6. An apparatus for continuous extrusion that includes, an extrusion cylinder, feeding means for feeding material into said extrusion cylinder, pressure means for actuating said feeding means with a predetermined pressure for filling said extrusion cylinder and simultaneously eject material from the extrusion cylinder, plastic material flow controlling means operable during operation of said feeding means for cutting off the feeding of material into said extrusion cylinder and thereby stop ejection of plastic material by said feeding means, an ejection means for ejecting material from said extrusion cylinder, means for operating said ejection means at a relatively constant rate of movement irrespective of resistance met by said ejection means, means operated by said flow controlling means just before the said means stops flow of material to said extrusion cylinder for initiating actuation of said ejection means to place same in operation before said pressure operated feeding means stops ejecting material from said extrusion cylinder to thereby maintain continuous extrusion from the extrusion cylinder at relatively constant pressure upon the material in the extrusion cylinder, means operated in response to the position of the flow controlling means when the flow of material from the feeding means to said extrusion cylinder is stopped thereby for initiating operation of said feeding means to pick up a fresh charge of material to be fed into said extrusion cylinder, means operated in response to the position of the feeding means when said feeding means has received a fresh charge of material for initiating actuation of said pressure means to apply pressure upon said feeding means, and means responsive to a predetermined pressure upon said feeding means for initiating actuation of said flow controlling means to operate the same to permit flow of material from the feeding means into said extrusion cylinder while said extrusion means is still actively extruding material from the extrusion cylinder.

7. An apparatus for continuous extrusion that includes, an extrusion cylinder, feeding means for feeding material into said extrusion cylinder, pressure means for actuating said feeding means with a predetermined pressure for filling said extrusion cylinder and simultaneously eject material from the extrusion cylinder, plastic material flow controlling means operable during operation of said feeding means for cutting off the feeding of material into said extrusion cylinder and thereby stop ejection of plastic material by said feeding means, an ejection means for ejecting material from said extrusion cylinder, means for operating said ejection means at a relatively constant rate of movement irrespective of resistance met by said ejection means, means operated by said flow controlling means just before the said means stops flow of material to said extrusion cylinder for initiating actuation of said ejection means to place same in operation before said pressure operated feeding means stops ejecting material from said extrusion cylinder to thereby maintain continuous extrusion from the extrusion cylinder at relatively constant pressure upon the material in the extrusion cylinder, means operated in response to the position of the flow controlling means when the flow of material from the feeding means to said extrusion cylinder is stopped thereby for initiating operation of said feeding means to pick up a fresh charge of material to be fed into said extrusion cylinder, means operated in response to the position of the feeding means when said feeding means has received a fresh charge of material for initiating actuation of said pressure means to apply pressure upon said feeding means, means responsive to a predetermined pressure upon said feeding means for initiating actuation of said flow controlling means to operate the same to permit flow of material from the feeding means into said extrusion cylinder while said extrusion means is still actively extruding material from the extrusion cylinder, and means operated in response to the position of the flow controlling means during opening of said flow controlling means for rendering said extrusion means inactive, said feeding means causing filling of said extrusion cylinder and extruding plastic material therefrom as a result of the pressure applied thereon during inactivity of said extrusion means for extrusion purposes.

8. An apparatus for continuous extrusion that includes, an extrusion cylinder, feeding means for feeding material into said extrusion cylinder, pressure means for actuating said feeding means with a predetermined pressure for filling said extrusion cylinder and simultaneously eject material from the extrusion cylinder, plastic material flow controlling means operable during operation of said feeding means for cutting off the feeding of material into said extrusion cylinder and thereby stop ejection of plastic material by said feeding means, an ejection means for ejecting material from said extrusion cylinder, means for operating said ejection means at a relatively constant rate of movement irrespective of resistance met by said ejection means, means operated by said flow controlling means just before the said means stops flow of material to said extrusion cylinder for initiating actuation of said ejection means to place same in operation before said pressure operated feeding means stops ejecting material from said extrusion cylinder to thereby maintain continuous extrusion from the extrusion cylinder at relatively constant pressure upon the material in the extrusion cylinder, means operated in response to the positon of the flow controlling means when the flow of material from the feeding means to said extrusion cylinder is stopped thereby for initiating operation of said feeding means to pick up a fresh charge of material to be fed into said extrusion cylinder, means operated in response to the position of the feeding means when said feeding means has received a fresh charge of material for initiating actuation of said pressure means to apply pressure upon said feeding means, means responsive to a predetermined pressure upon said feeding means for initiating actuation of said flow controlling means to operate the same to permit flow of material from the feeding means into said extrusion cylinder while said extrusion means is still actively extruding material from the extrusion cylinder, means operated in response to the position of the flow controlling means during opening of said flow controlling means for rendering said extrusion means inactive, said feeding means causing filling of said extrusion cylinder and extruding plastic material therefrom as a result of the pressure applied thereon during inactivity of said extrusion means for extrusion purposes, and means rendered active in response to the position of the flow controlling means during opening thereof and inactivity of said extrusion means for initiating operation of said flow controlling means to cut off the flow of material from the feeding means to the extrusion cylinder, and thereby produce complete automatic operation.

BERNARD D. ASHBAUGH.

REFERENCES CITED

The following references are of record in the file of this patent:

UNITED STATES PATENTS

| Number | Name | Date |
|---|---|---|
| 688,269 | Sutherland | Dec. 3, 1901 |
| 2,084,149 | Larsen | June 15, 1937 |
| 2,202,140 | Burroughs | May 28, 1940 |
| 2,263,183 | Martin | Nov. 18, 1941 |
| 2,282,308 | Dahlin | May 12, 1942 |

FOREIGN PATENTS

| Number | Country | Date |
|---|---|---|
| 665,832 | France | May 13, 1929 |
| 511,764 | Great Britain | Aug. 23, 1939 |
| 501,277 | Great Britain | Feb. 21, 1939 |